United States Patent [19]
Yoshino et al.

[11] Patent Number: 5,880,061
[45] Date of Patent: Mar. 9, 1999

[54] ACTIVE CARBON AND METHOD FOR ITS PRODUCTION

[75] Inventors: Yoshio Yoshino; Atsushi Matsumoto; Kimitoshi Ohishi; Akihide Yoshida, all of Kitakyushu, Japan

[73] Assignee: Mitsubishi Chemical Corporation, Tokyo, Japan

[21] Appl. No.: 662,018

[22] Filed: Jun. 12, 1996

[30] Foreign Application Priority Data

Jun. 13, 1995 [JP] Japan ................................... 7-145909

[51] Int. Cl.$^6$ ............................ B01J 20/32; C01B 31/00; C09C 1/56
[52] U.S. Cl. ..................... 502/416; 502/417; 502/418; 502/428; 502/432; 502/437; 423/445 R; 423/460
[58] Field of Search ................. 423/445 R, 460; 502/416, 417, 418, 428, 432, 437

[56] References Cited

U.S. PATENT DOCUMENTS

| | | | |
|---|---|---|---|
| 3,864,277 | 2/1975 | Kovach | 502/425 |
| 3,994,829 | 11/1976 | Alford | 502/432 |
| 4,131,566 | 12/1978 | Murty | 502/425 |
| 4,519,985 | 5/1985 | Wells et al. | 502/416 |
| 4,857,243 | 8/1989 | Von Blucher et al. | 502/416 |
| 4,954,469 | 9/1990 | Robinson | 502/516 |
| 5,071,820 | 12/1991 | Quinn et al. | 502/416 |
| 5,204,310 | 4/1993 | Tolles et al. | 502/416 |
| 5,212,144 | 5/1993 | Schwartz, Jr. | 502/423 |
| 5,304,527 | 4/1994 | Dimitri | 502/416 |
| 5,438,029 | 8/1995 | Kobata et al. | 502/423 |
| 5,446,005 | 8/1995 | Endo | 502/416 |
| 5,498,589 | 3/1996 | Schroter et al. | 502/416 |
| 5,614,459 | 3/1997 | Mondragon et al. | 502/418 |
| 5,614,460 | 3/1997 | Schwarz et al. | 502/418 |
| 5,626,637 | 5/1997 | Baker | 502/416 |

*Primary Examiner*—Mark L. Bell
*Assistant Examiner*—Patricia L. Hailey
*Attorney, Agent, or Firm*—Oblon, Spivak, McClelland, Maier & Neustadt, P.C.

[57] ABSTRACT

Active carbon having a pore size distribution obtained from a nitrogen adsorption isothermal line such that the volume of pores having a pore diameter of less than 15 Å is at least 0.25 ml/g and constitutes at least 40% of the total volume of pores having a pore diameter of at most 300 Å, and the volume of pores having a pore diameter of from 100 to 300 Å constitutes at least 10% of the total volume of pores having a pore diameter of at most 300 Å.

2 Claims, No Drawings

ACTIVE CARBON AND METHOD FOR ITS PRODUCTION

BACKGROUND OF THE INVENTION

1. Field of the Invention

The present invention relates to active carbon and a method for its production. More particularly, it relates to coal-based active carbon which exhibits excellent performance in adsorption of a trihalomethane formed by the reaction of an organic substance contained in a city water, with residual chlorine added for disinfection in a water purification process and which is useful for removal of an odor (musty odor) material in city water, for a solvent recovery, or for adsorption in a gas phase field such as purification and separation of a gas.

2. Discussion of Background

Recently, it has been ascertained that the water quality in a water source has deteriorated due to e.g. eutrophication, and an organic substance represented by humin, is contained in the source water. Such an organic substance has caused "musty odor" in various areas, and such "musty odor" can not be removed by conventional water purifying equipments (such as rapid filtration/chlorine treatment) and thus has created a serious problem. Further, such an organic substance not only causes an off-flavor taste but also reacts with residual chlorine added for disinfection to form a carcinogenic trihalomethane, and thus it is regarded as problematic. Accordingly, active carbon is desired which is capable of effectively removing such an organic substance in a water purification process.

Active carbon is a carbon material having a developed porous structure and shows various properties depending upon its starting material (coconut shell, sawdust, coal, etc.) or the activation method, and its adsorption performance varies substantially. The adsorption performance of active carbon is not simply determined by the pore volume, but is substantially influenced by the size of the molecule of the substance to be adsorbed and the size of pore diameters of the active carbon. For removal of a polymer compound such as the above-mentioned humin, it is common to employ active carbon having a large pore diameter, and for removal of a trihalomethane as a low molecular weight compound, or an odor material or a substance to be adsorbed in a gas phase, it is common to employ active carbon having a small pore diameter.

The pore size distribution of active carbon varies to some extent by the conditions for its production. However, mostly it depends on the type of the carbonaceous material, and by the conventional technique, if the same material is used, the resulting active carbon will always have a similar pore size distribution pattern. Accordingly, to change the pore size distribution, the starting material has to be changed. Specifically, to remove a trihalomethane as a low molecular weight compound, or an odor material or a substance to be adsorbed in a gas phase, active carbon is required to be of wood-based (made of e.g. coconut shell or sawdust), and it has been believed that with coal-based active carbon, it is difficult to sufficiently develop micropores having a pore diameter of less than 15 Å, which are suitable for adsorption of such a low molecular weight compound. An attempt has been made to blend two or more carbonaceous starting materials, but such an attempt has failed in controlling the pore size distribution.

It is an object of the present invention to obtain active carbon which is an active carbon made of coal as starting material, which has micropores having a pore diameter of less than 15 Å developed, and which has an improved performance for removing a trihalomethane formed in a water purification process, or an odor material or a substance to be adsorbed in a gas phase.

The present inventors have conducted various studies to accomplish the above object. As a result, it has been found that active carbon obtained by incorporating a coal having a certain specific physical property in a certain specific proportion, has an increased quantity of pores having a pore diameter of less than 15 Å, and consequently, has an improved performance for removing a trihalomethane formed in a water purification process, or an odor material or a substance to be adsorbed in a gas phase, and further that the active carbon thus obtained is novel with the quantity of pores within a range of from 100 to 300 Å being also larger than the quantity in a wood-based active carbon, whereby diffusion of the trihalomethane or the odor material in the pores of active carbon is accelerated, and the adsorption rate becomes faster. As a result of a further research, it has also been found that the amount of adsorption and the adsorption rate of the trihalomethane or the odor material or the like, can be remarkably improved by using active carbon wherein the volume of pores having a pore diameter of less than 15 Å is in a specific range and such a volume constitutes a specific proportion to the total volume of pores having a pore diameter of at most 300 Å, and the volume of pores having a pore diameter of from 100 to 300 Å also constitutes a specific proportion to the total volume of pores having a pore diameter of at most 300 Å. The present invention has been accomplished on the basis of this discovery.

Namely, the present invention provides active carbon having a pore size distribution obtained from a nitrogen adsorption isothermal line such that the volume of pores having a pore diameter of less than 15 Å is at least 0.25 ml/g and constitutes at least 40% of the total volume of pores having a pore diameter of at most 300 Å, and the volume of pores having a pore diameter of from 100 to 300 Å constitutes at least 10% of the total volume of pores having a pore diameter of at most 300 Å.

The present invention also provides a method for producing a coal-based granulated active carbon, which comprises carbonizing and activating a blend comprising from 30 to 95 wt % of hard coking bituminous coal containing at most 35 wt % of a volatile component and having a CSN (crucible swelling number) of at least 5 and from 5 to 70 wt % of bituminous coal or semibituminous coal containing at least 35 wt % of a volatile component and having a CSN of at most 4.5.

Now, the present invention will be described in detail.

In the method of the present invention, a blend comprising from 30 to 95 wt % of bituminous coal showing a strong caking property (hereinafter referred to as "hard coking bituminous coal") and from 5 to 70 wt % of weakly caking or non-caking bituminous coal or semibituminous coal (hereinafter referred to as "blending coal"), is used as a blend coal (hereinafter referred to as "blend coal").

Here, hard coking bituminous coal is bituminous coal which contains at most 35 wt % of a volatile component (including no water or ash, the same applies hereinafter) and a CSN of at least 5 and which shows a hard coking property. The volatile component is more preferably from 25 to 35 wt %, and the CSN is more preferably from 7 to 9, whereby active carbon having particularly excellent properties can be obtained.

Here, the weight % of the volatile component is the value measured by JIS M8812-1972, and the CSN is a value measured by JIS M8801-1979.

The blending coal is bituminous coal or semibituminous coal which contains at least 35 wt % of a volatile component and has a CSN of at most 4.5. The volatile component is more preferably from 40 to 60 wt %, and the CSN is more preferably at most 4.0, whereby active carbon having particularly excellent properties can be obtained.

The blending coal is incorporated in an amount of from 5 to 70 wt %, preferably from 30 to 50 wt %. If the blending coal is incorporated in an amount exceeding 70 wt %, the strength of the resulting active carbon will be remarkably low, and if the amount of the blending coal is less than 5 wt %, development of pores having a pore diameter of less than 15 Å tends to be insufficient.

The above-mentioned blend coal obtained by blending the hard coking bituminous coal and the blending coal, is finely pulverized to a usual particle size to obtain fine powder coal, which will be used as the starting material. The usual particle size is specifically at a level of $d_{50}$=75 to 250 μm. This fine powder coal is molded to obtain granulated coal. The molding may be carried out by a conventional method by means of an extrusion molding machine or a spherical granulator. The granulated coal will be in the form of pellets by the extrusion molding machine and spherical granules by the spherical granulator, and the molded product obtained by the press molding machine will be pulverized into a pulverized form. In the present invention, granulated coal may have any one these shapes.

The granulated coal thus obtained is dried and carbonized by a conventional method using an external heat or internal heat in a rotary furnace, a fluidized bed furnace or a moving bed furnace, or a combination of such an external heat and an internal heat, and then activation is carried out with steam or an activating agent such as carbon dioxide or oxygen, to obtain active carbon.

By the above described method of the present invention, it is possible to obtain active carbon of the present invention having a pore size distribution obtained from a nitrogen adsorption isothermal line such that the volume of pores having a pore diameter of less than 15 Å is at least 0.25 ml/g and constitutes at least 40% of the total volume of pores having a pore diameter of at most 300 Å, and the volume of pores having a pore diameter of from 100 to 300 Å constitutes at least 10% of the total volume of pores having a pore diameter of at most 300 Å. Here, the volume of pores having a pore diameter of less than 15 Å, the volume of pores having a pore diameter of from 100 to 300 Å and the proportions thereof to the total volume of pores having a pore diameter of at most 300 Å, can be obtained by a Cranston Inkley method using liquid nitrogen. The active carbon of the present invention which thus has the specific volume of pores having a specific pore diameter and the specific proportion to the total volume, is excellent in the performance for removing a trihalomethane, or an odor material or a substance to be adsorbed in a gas phase.

Active carbon of the present invention has the excellent properties as described above in every case. Among them, the one wherein the volume of pores having a pore diameter of less than 15 Å is at least 0.3 ml/g and constitutes from 50 to 90% of the total volume of pores having a pore diameter of at most 300 Å, exhibits particularly excellent adsorption performance. Such active carbon of the present invention can readily be obtained by the method of the present invention.

Now, the present invention will be described in further detail with reference to Examples. However, it should be understood that the present invention is by no means restricted to such specific Examples. In the present invention, the pore volume is the one measured by a Cranston Inkley method using liquid nitrogen. Further, the weight % of a volatile component (containing no water or ash, the same applies hereinafter) in Table 1 is the value measured in accordance with JIS M8812-1972, and the CSN is the value measured in accordance with JIS M8801-1979.

EXAMPLE 1

40 parts by weight of a blending coal having a volatile component of 49 wt % and a CSN of 0, was incorporated to 60 parts by weight of bituminous coal having a volatile component of 31 wt % and a CSN of 8.5, to obtain a blend coal, which was finely pulverized until 50 wt % passed through 44 μm, to obtain fine powder coal. The fine powder coal was molded under pressure by a twin roll molding machine, followed by pulverization to obtain granulated coal having a diameter of from about 1 to 3 mm. This granulated coal was dried by supplying a gas mixture of nitrogen and oxygen in a rotary kiln of external heating system. Then, supply of the oxygen gas was terminated to bring the oxygen concentration to 0%, and after raising the temperature from 400° C. to 700° C. at a rate of 3.3° C./min, the temperature was maintained at 700° C. for 30 minutes for carbonization to obtain a carbonized product. This carbonized product was put into the above rotary kiln, and a gas mixture comprising 50 vol % of nitrogen and 50 vol % of steam, was passed therethrough at 1,000° C. to activate the carbonated product to a yield of 50 wt %, to obtain active carbon. With respect to the obtained active carbon, the volume of pores having a pore diameter of less than 15 Å was measured, and a chloroform equilibrium adsorption test was carried out to evaluate the performance for adsorption of a trihalomethane. The results are shown in Tables 1 and 2.

EXAMPLE 2

With respect to the product prepared under the same conditions as in Example 1 except that the activation temperature was different, the various properties were measured, and the results are shown in Tables 1 and 2.

EXAMPLE 3

With respect to the product prepared under the same conditions as in Example 1 except that the blend ratio of the bituminous coal and the blending coal was different, various properties were measured. The results are shown in Tables 1 and 2.

COMPARATIVE EXAMPLES 1 AND 2

With respect to the products prepared under the same conditions as in Example 1 except that the coal to be incorporated to bituminous coal was different, various properties were measured, and the results are shown in Tables 1 and 2.

TABLE 1

| | Bituminous coal | | Blending coal | | Proportion of blending coal (wt %) | Activating temperature (°C.) |
|---|---|---|---|---|---|---|
| | Volatile component (wt %) | CSN | Volatile component (wt %) | CSN | | |
| Example 1 | 31.0 | 8.5 | 48.9 | 0 | 40 | 1000 |
| Example 2 | 31.0 | 8.5 | 48.9 | 0 | 40 | 980 |
| Example 3 | 31.0 | 8.5 | 48.9 | 0 | 60 | 1000 |
| Comparative Example 1 | 31.0 | 8.5 | 25.1 | 8.5 | 40 | 1000 |
| Comparative Example 2 | 31.0 | 8.5 | 33.0 | 6.0 | 40 | 1000 |

TABLE 2

| | <15 Å pore volume (ml/g) | Proportions (%) of respective pore volumes in <300 Å pore volume | | Amount of equilibrium adsorption of chloroform at 50 ppb (mg/g) | JIS hardness (%) |
|---|---|---|---|---|---|
| | | <15 Å | 100–300 Å | | |
| Example 1 | 0.35 | 58 | 13 | 1.8 | 90 |
| Example 2 | 0.34 | 57 | 12 | 1.7 | 89 |
| Example 3 | 0.33 | 68 | 14 | 1.5 | 50 |
| Comparative Example 1 | 0.05 | 20 | 2 | 0.1 | 75 |
| Comparative Example 2 | 0.21 | 33 | 7 | 0.8 | 75 |

According to the present invention, it is possible to obtain coal-based active carbon having a high absorptivity, wherein micropores having a pore diameter of less than 15 Å are developed to provide particularly excellent performance for adsorption of e.g. a low molecular weight compound, and the volume of pores of from 100 to 300 Å is large as compared with conventional wood-based active carbon, whereby it provides very high adsorptivity as an adsorbent for a trihalomethane in a water purification process, or for an odor material or a substance to be adsorbed in a gas phase.

What is claimed is:

1. Active carbon having a pore size distribution obtained from a nitrogen adsorption isothermal line such that the volume of pores having a pore diameter of less than 15 Å is at least 0.25 ml/g and constitutes at least 40% of the total volume of pores having a pore diameter of at most 300 Å, and the volume of pores having a pore diameter of from 100 to 300 Å constitutes at least 10% of the total volume of pores having a pore diameter of at most 300 Å.

2. The active carbon according to claim 1, wherein the volume of pores having a pore diameter of less than 15 Å is at least 0.3 ml/g and constitutes from 50 to 90% of the total volume of pores having a pore diameter of at most 300 Å.

* * * * *